Sept. 9, 1947.         F. J. W. JANSEN         2,427,144
           MECHANICAL CONNECTION FOR ELECTRICAL CIRCUITS
                   Filed Nov. 23, 1936        3 Sheets-Sheet 1
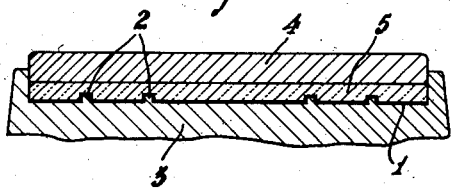
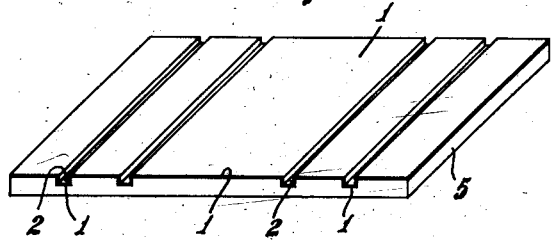
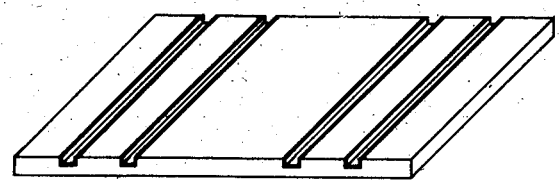
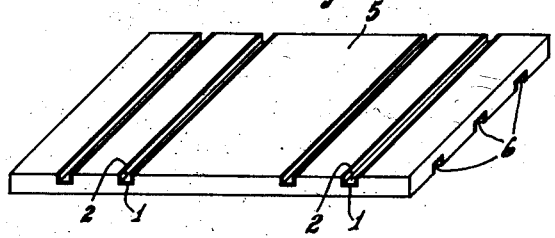

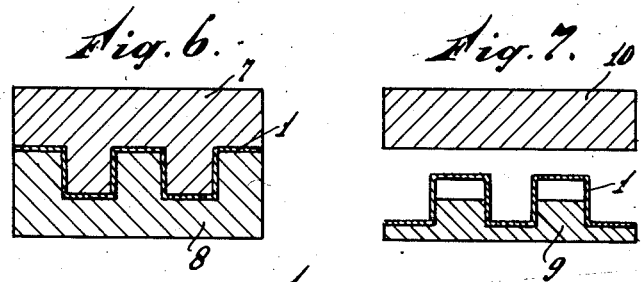
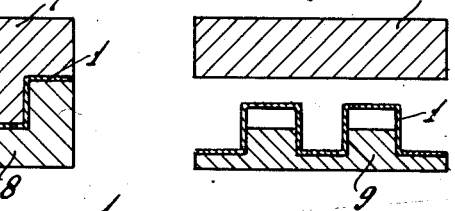
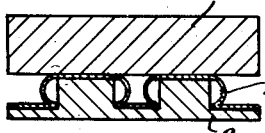
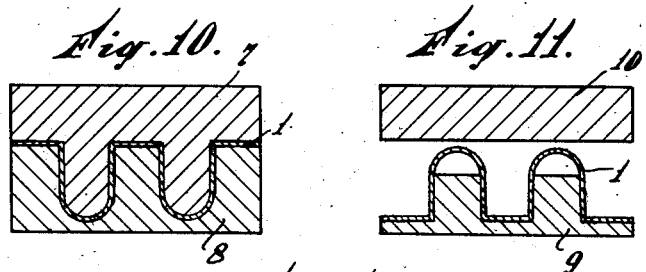
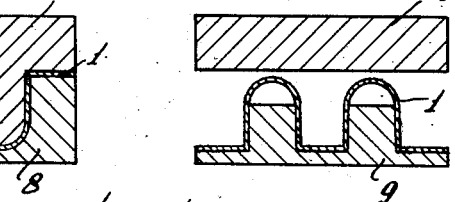
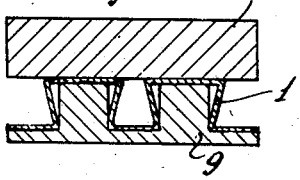

Sept. 9, 1947.   F. J. W. JANSEN   2,427,144
MECHANICAL CONNECTION FOR ELECTRICAL CIRCUITS
Filed Nov. 23, 1936   3 Sheets-Sheet 3
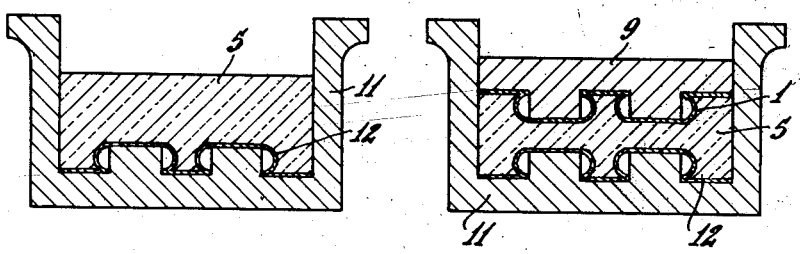
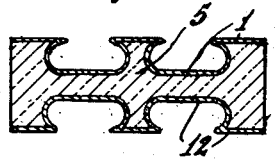
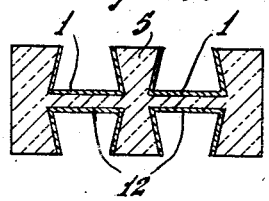

Patented Sept. 9, 1947

2,427,144

UNITED STATES PATENT OFFICE 2,427,144

MECHANICAL CONNECTION FOR ELECTRICAL CIRCUITS

Franciscus Johannes Wilhelmus Jansen, Dar es Salaam, Tanganyika, East Africa

Application November 23, 1936, Serial No. 112,424

Section 3, Public Law 690, August 8, 1946.
Patent expires November 23, 1956

9 Claims. (Cl. 175—298)

This invention relates to mechanical connectors for electrical circuits and a method of making the same.

Although this invention is primarily intended for use in connecting radio apparatus it may be used with equal facility with a wide variety of electrical apparatus requiring any type of circuit.

Heretofore the arrangement and connections of the parts of radio sets and other electrical apparatus has been effected by hand in continuous mass production. Attempts have been made to eliminate this hand work, but mechanically arranged wiring has met with great difficulty in the connections due to looseness, resulting in increased electrical resistance and uncertainty of results. Many of the prior devices were fragile and easily damaged in handling and, in so far as metal foils were used there was the necessity for complicated cutting devices, as well as difficult preliminary and final treatments.

A primary object of this invention is the provision of electrical wiring and connections in a panel of pressed or molded insulating material.

Another object of this invention is the provision of a simple method of manufacturing the previously mentioned wiring panel.

Another object is to provide a pressed or molded panel having electrical conductors set in grooves in the surface thereof.

A further object is to provide a panel for electrical wiring having electrical conductors set in the opposite sides of an insulating panel in such a manner that connections may be made from a conductor on one side to a conductor on the other side by merely leaving or drilling a hole at their intersection and placing a conductor through this hole.

Still a further object is the provision of means for shaping electrical conductors so that when they are imbedded in the surface of sheet material they will be immovably held thereby.

Other objects of this invention will be apparent from these specifications and the accompanying drawings forming a part thereof and the scope is to be limited only by the claims appended hereto.

In the drawings:

Fig. 1 is a sectional view through the panel of this invention and the mould or press;

Fig. 2 is a top view of the panel shown in Fig. 1;

Fig. 3 is a similar view of the panel shown in Fig. 2 except that the metal sheet has been removed from the flat surface of the panel;

Fig. 4 shows a panel similar to that shown in Fig. 3, but having electrical conductors imbedded in both sides thereof;

Fig. 5 is an edge view of a sheet of an electrical conductor;

Fig. 6 is a sectional view of the dies of a stamping machine in the closed position with a sheet of metal therebetween;

Fig. 7 is a sectional view of the dies of a stamping machine and the stamped metal sheet from Fig. 6 mounted therebetween, before these dies have reformed said sheet;

Fig. 8 is a sectional view of the elements shown in Fig. 6 after the dies have reformed the sheet;

Figs. 9, 10, 11 and 12 illustrate respectively the same steps illustrated by Figs. 5, 6, 7 and 8, but show a different form of dies for producing a differently shaped sheet of metal;

Fig. 13 is a sectional view of a hollow mold having the sheet of metal shown in Fig. 8 and moldable insulating material placed therein; and an upper portion of the mould adapted to fit in the hollow portion also having a sheet of metal from Fig. 8 mounted thereon;

Fig. 14 shows the apparatus and material shown in Fig. 13 after the two portions of the mould have been pressed to the final position;

Fig. 15 is a sectional view of the panel produced as a result of the steps shown in Figs. 5, 6, 7, 8, 13 and 14;

Fig. 16 is a sectional view of the panel of Fig. 15 after the metal has been removed from the upper and lower surfaces thereof; and Fig. 17 is a sectional view of a modified form of the panel shown in Fig. 16, resulting from the use of the dies shown in Figs. 10, 11 and 12 and then completed as in Figs. 13, 14, 15 and 16.

Referring now to the drawings there is shown at 1 an electrical conductor such as sheet metal. In Figs. 1, 2, 3 and 4 the sheet metal 1 is shown having rectangular ribs or grooves 2 rolled or stamped therein by means of dies similar to those shown in Fig. 6 at 7 and 8. The sheet 1 of Fig. 1 may be pre-pressed to form ribs in the locations necessary for wiring electrical apparatus and then placed in the bottom portion 3 of a mould or press and covered with a moldable or pressable insulating material 5 such as "Bakelite", "Vinylite" or other plastics. An upper die 4 is provided to squeeze the sheet 1 and the insulating material 5 into permanent contact and form the panel shown in Fig. 2. This panel is then milled or ground on the surface that is covered with the sheet metal, thereby removing all of the metal on the flat surface and leaving the grooves bearing metal as lined troughs or "wires." If it is desired to leave an electrical connection between two wires this may obviously be done in the milling or grinding operation.

In Fig. 4 there are shown conductors or "wires" 6, on the opposite side of a panel 5, arranged in a direction normal to the "wires" 2 previously described. If anywhere a connection is necessary between a conductor 2 and a conductor 6, it may be made during the pressing operation by punching an aperture in the plastic plate 5 in the desired place, and placing therein a metal bushing or bolt connecting the two conductors.

If necessary, the wiring of apparatus may be composed of a number of plates or panels 5 which are provided with conductors formed in the described manner, or connections between conductors of different panels produced by means of metal strips or cables.

Though such is not a part of this invention, it will be possible and often desirable to mount some or all parts of a radio set or other apparatus on the panels 5 and to provide the necessary bolt holes therefor during the pressing operation.

In order to insure a stronger attachment of the metal conductors to the insulating material the conductos may be so formed that aside from any adhesion to the insulating material they would be non-removable. Two such forms and methods of producing the shapes and then mounting them in the insulating material are shown in Figs. 5 to 17 inclusive.

Figs. 5 and 9 show the metal sheet 1 upon which the operation starts. This sheet 1 is pressed between the dies 7 and 8 as shown in Figs. 6 or 10. Next the sheet 1 is placed on a new die 9 the ribs of which are lower, Figs. 7 and 11, and it is pressed by a flat upper die 10 as shown in Figs. 8 and 12 which spreads the bottom of the ribs of the sheet 1.

The ribbed sheets of metal 1, regardless of the shape of the rib may be placed on opposite sides of a panel of insulating material which may be either molded or formed in a press. A panel such as is shown in Fig. 15 may be made by placing one such sheet 12 on the bottom of a hollow die 11 with the ribs positioned upwardly, Fig. 13, then placing the molding material 5 in either the plastic or powdered state on top of this sheet and then pressing a similarly ribbed sheet 1 into the insulating material 5 by means of an upper die 9. This panel may then be completed by grinding or milling as previously described leaving a finished panel as illustrated in Figs. 16 or 17.

Having thus described both the method and product of my invention, what I claim as new and desire to secure by Letters Patent is:

1. A method of producing pre-arranged wiring for connecting the several parts of electrical apparatus having complicated wiring circuits, comprising the steps of forming troughs in electrical conducting sheet material, backing said sheet material with an electrical insulating material, then removing a portion of said sheet material from between said troughs, whereby an electrical insulating panel having electrical conductors mounted in a surface thereof is produced.

2. Method of forming connections for connecting the related parts of electrical apparatus, comprising shaping sheet metal to form therein channels of configuration and spacing corresponding to the connectors of a desired wiring diagram, placing the sheet metal on corresponding dies, flowing moldable insulating plastic thereabout, molding the plastic firmly and securely about said metal, then removing the sheet metal from the surface of the insulating plastic, leaving sheet metal conductors securely embedded therein.

3. Method of forming connectors for connecting the related parts of electrical apparatus, comprising shaping sheet metal to form therein channels of substantially U-section, of configuration and spacing corresponding to the connectors of a desired wiring diagram, placing the sheet metal thus shaped on dies of shaping and configuration identical with that first used, but with the projecting parts somewhat shorter, pressing the sheet metal to change the shapes of the channels so that some portion thereof will be wider in section than their mouths, placing the sheet metal on corresponding dies, flowing in moldable insulating plastic, molding the plastic firmly and securely about said metal, then removing the sheet metal from the surface of the insulating plastic, leaving sheet metal conductors securely embedded therein.

4. In a method of forming connectors for connecting the related parts of electrical apparatus, employing complicated wiring circuits, wherein sheet metal having conducting channels therein is first firmly embedded in a moldable plastic, the surplus sheet metal then being removed; the steps of first shaping the sheet metal to form therein channels of desired configuration, then placing the sheet metal over a die of configuration identical with that of the pre-shaped sheet metal but having ribs shorter than the depths of the troughs in the sheet metal, and pressing the sheet metal with a top die so as to flatten the channels in the metal, making them wider in cross-section in some portion of the channels than at their mouths.

5. Method of forming connections for connecting the related parts of electrical apparatus, comprising shaping sheet metal to form therein channels of configuration and spacing corresponding to the connectors of a desired wiring diagram, placing said sheet metal on a bottom die of suitable configuration, flowing moldable insulating plastic into the die mold over said sheet metal, placing a second sheet metal strip having a desired wiring diagram stamped therein over said plastic while the latter is still moldable, die-pressing the ensemble to mold the plastic firmly and securely about the metal sheets, then removing the sheet metal from the surfaces of the insulating plastic, leaving sheet metal conductors securely embedded in both sides of said plastic.

6. Method of forming connections for connecting the related parts of electrical apparatus, comprising shaping sheet metal to form therein channels of configuration and spacing corresponding to the connectors of a desired wiring diagram, placing said sheet metal on a bottom die of suitable configuration, flowing moldable insulating plastic into the die mold over said sheet metal, placing a second sheet metal strip having a desired wiring diagram stamped therein over said plastic while the latter is still moldable, arranging the second sheet metal strip so that the longitudinal axes of the channels therein will lie approximately normal to those of the first strip of sheet metal, die-pressing the ensemble to mold the plastic firmly and securely about the metal sheets, then removing the sheet metal from the surfaces of the insulating plastic, leaving sheet metal conductors securely embedded in both sides of said plastic.

7. A panel for use in wiring and interconnecting the several parts of electrical apparatus having complicated wiring circuits, comprising a sheet of electrical insulating material, electrical conductors set in one surface of said sheet, and similar electrical conductors set in the opposite surface of said sheet, the said insulating material being molded about said conductors to hold them securely, said conductors being trough-shaped in cross-section and positioned in said sheet with the bottom of the trough set within the body of the sheet.

8. A panel for use in wiring and interconnecting the several parts of electrical apparatus having complicated wiring circuits, comprising a sheet of electrical insulating material, electrical conductors set in one surface of said sheet, and similar electrical conductors set in the opposite surface of said sheet, the said insulating material being molded about said conductors to hold them securely, said conductors being trough-shaped in cross-section and positioned in said sheet with the bottom of the trough set within the body of the sheet, the conductors on one said surface of said sheet being disposed approximately normal to the conductors on the other surface of the sheet.

9. A panel for use in wiring and interconnecting the several parts of electrical apparatus having complicated wiring circuits, comprising a sheet of electrical insulating material and a trough-shaped electrical conductor set in the surface of said sheet, said trough throughout its entire extent being wider at the bottom thereof than at the open side, whereby said conductor at all points along its length is securely held by said insulating material.

FRANCISCUS JOHANNES
WILHELMUS JANSEN.

REFERENCES CITED

The following references are of record in the file of this patent:

UNITED STATES PATENTS

| Number | Name | Date |
|---|---|---|
| 290,845 | Breckenridge | Dec. 25, 1883 |
| 535,321 | Delany | Mar. 5, 1895 |
| 905,045 | Ayer et al. | Nov. 24, 1908 |
| 1,767,715 | Stoekle | June 24, 1930 |
| 1,837,678 | Ryder | Dec. 22, 1931 |
| 1,994,767 | Heintz | Mar. 19, 1935 |
| 2,066,715 | Arlt | Jan. 5, 1937 |

FOREIGN PATENTS

| Number | Country | Date |
|---|---|---|
| 19,919 | Great Britain | 1892 |